(12) United States Patent
Zhang

(10) Patent No.: US 9,170,456 B2
(45) Date of Patent: Oct. 27, 2015

(54) DIRECT BACKLIGHT MODULE AND LIQUID CRYSTAL DISPLAY MODULE USING THE BACKLIGHT MODULE

(71) Applicant: Shenzhen China Star Optoelectronics Technology Co., LTD., Shenzhen, Guangdong Province (CN)

(72) Inventor: Yanxue Zhang, Shenzhen (CN)

(73) Assignee: SHENZHEN CHINA STAR OPTOELECTRONICS TECHNOLOGY CO., LTD., Shenzhen, Guangdong Province (CN)

( * ) Notice: Subject to any disclaimer, the term of this patent is extended or adjusted under 35 U.S.C. 154(b) by 210 days.

(21) Appl. No.: 13/807,716

(22) PCT Filed: Nov. 20, 2012

(86) PCT No.: PCT/CN2012/084857
§ 371 (c)(1),
(2) Date: Dec. 28, 2012

(87) PCT Pub. No.: WO2014/075323
PCT Pub. Date: May 22, 2014

(65) Prior Publication Data
US 2014/0226102 A1    Aug. 14, 2014

(51) Int. Cl.
*G02F 1/1335* (2006.01)
*G02F 1/1333* (2006.01)
(52) U.S. Cl.
CPC .... *G02F 1/133608* (2013.01); *G02F 1/133603* (2013.01); *G02F 2001/133314* (2013.01)

(58) Field of Classification Search
CPC .......................................... G02F 2001/133314
See application file for complete search history.

(56) References Cited

U.S. PATENT DOCUMENTS

2010/0079977 A1    4/2010  Lee et al.
2010/0259704 A1*   10/2010 Fu et al. .......................... 349/58

FOREIGN PATENT DOCUMENTS

| CN | 101573554 A | 11/2009 |
|---|---|---|
| CN | 101849134 A | 9/2010 |
| CN | 201672468 U | 12/2010 |
| CN | 102384409 A | 3/2012 |
| CN | 102606963 A | 7/2012 |
| JP | 2008-84631 A | 4/2008 |

* cited by examiner

*Primary Examiner* — Wen-Ying P Chen
(74) *Attorney, Agent, or Firm* — Cheng-Ju Chiang

(57) ABSTRACT

The present invention provides a direct backlight module and a liquid crystal display module using the backlight module. The backlight module includes a backplane, a diffusion platen arranged inside the backplane, and backlight sources mounted to the backplane and located under the diffusion plate. The backplane includes a bottom board and side boards connected to the bottom board. The bottom board forms receiving openings. The backlight sources are mounted to a side of the bottom board that is distant from the diffusion plate to correspond to the receiving openings. With the backplane having a bottom board that includes a circumferential frame and braces collectively defining receiving openings and backlight sources being mounted to a side of the bottom board that is distant from a diffusion plate to correspond to the receiving openings, it only need to remove the backlight sources in maintaining or replacing the backlight sources.

10 Claims, 6 Drawing Sheets

DIRECT BACKLIGHT MODULE AND LIQUID CRYSTAL DISPLAY MODULE USING THE BACKLIGHT MODULE

BACKGROUND OF THE INVENTION

1. Field of the Invention

The present invention relates to the field of liquid crystal displaying, and in particular to a direct backlight module and a liquid crystal display module using the backlight module.

2. The Related Arts

Liquid crystal display (LCD) has a variety of advantages, such as thin device body, low power consumption, and being free of radiation, and is thus widely used. Most of the LCDs that are currently available in the market are backlighting LCDs, which comprise a liquid crystal panel and a backlight module. The operation principle of the liquid crystal panel is that liquid crystal molecules are interposed between two parallel glass substrates and the liquid crystal molecules are controlled to change direction by application of electricity to circuits of the glass substrates in order to refract out light emitting from the backlight module for generating images. Since the liquid crystal panel itself does not emit light, light must be provided by the backlight module in order to normally display images. Thus, the backlight module is one of the key components of an LCD. The backlight module can be classified in two types, namely side-edge backlight module and direct backlight module, according to the position where light gets incident. The direct backlight module comprises a light source, such as a cold cathode fluorescent lamp (CCFL) or a light-emitting diode (LED), which is arranged at the back side of the liquid crystal panel to form a planar light source that directly provides lighting to the liquid crystal panel.

Referring to FIG. 1, a liquid crystal display device that uses a direct backlight module comprises a direct backlight module 100, a mold frame 300 arranged on the direct backlight module 100, a liquid crystal display panel 500 arranged on the mold frame 300, and a front enclosure 700 arranged on the liquid crystal display panel 500. The direct backlight module 100 comprises a backplane 102, a diffusion plate 104 received in the backplane 102, and a backlight source 106 arranged in the backplane 102 and under the diffusion plate 104. The backplane 102 comprises a bottom board 122 and side boards 124 connected to the bottom board 122. The backlight source 106 is mounted to the bottom board 122. The backlight source 106 comprises a printed circuit board 162 and a plurality of LED (Light-Emitting Diode) lights 164 mounted to and electrically connected to the printed circuit board 162. When some or one of the LED lights 164 is broken and must be maintained or replaced, the front enclosure 700, the liquid crystal display panel 500, the mold frame 300, and the diffusion plate 104 must be first removed. This may inevitably causes potential damage to these components of the front enclosure 700, the liquid crystal display panel 500, the mold frame 300, and the diffusion plate 104 and results in increased maintenance cost. Further, removing and re-mounting these components of the front enclosure 700, the liquid crystal display panel 500, the mold frame 300, and the diffusion plate 104 consumes a great amount of labor and materials, making the maintenance cost high.

SUMMARY OF THE INVENTION

An object of the present invention is to provide a direct backlight module, which has a simple structure, is easy to assemble, and enables maintenance and replacement of the backlight module to be carried out without removing other components so as to greatly lower down the maintenance cost.

Another object of the present invention is to provide a liquid crystal display module, which comprises a backlight module having a backlight source that is mounted in a removable manner to make maintenance cost low.

To achieve the above object, the present invention provides a direct backlight module, which comprises a backplane, a diffusion platen arranged inside the backplane, and a plurality of backlight sources mounted to the backplane and located under the diffusion plate. The backplane comprises a bottom board and side boards connected to the bottom board. The bottom board forms a plurality of receiving openings. The backlight sources are mounted to a side of the bottom board that is distant from the diffusion plate to correspond to the receiving openings.

Each of the backlight sources comprises a printed circuit board and a plurality of LED lights mounted to and electrically connected to the printed circuit board.

The bottom board comprises a circumferential frame and braces mounted to the circumferential frame. The circumferential frame and the braces form therebetween the receiving openings.

The braces are arranged in a cross form and are mounted to the circumferential frame by bolts. The braces and the circumferential frame define four receiving openings. The backlight sources are correspondingly of a number of four.

The backlight sources are mounted to the backplane by bolts.

The circumferential frame is rectangular in shape and comprises two opposite first connection plates and two second connection plates respectively connected to opposite ends of the two first connection plates.

The side boards comprise two first side walls that are respectively and perpendicularly connected to the two first connection plates and two second side walls that are respectively perpendicularly connected to the two second connection plates.

The present invention also provides a direct backlight module, which comprises a backplane, a diffusion platen arranged inside the backplane, and a plurality of backlight sources mounted to the backplane and located under the diffusion plate, the backplane comprising a bottom board and side boards connected to the bottom board, the bottom board forming a plurality of receiving openings, the backlight sources being mounted to a side of the bottom board that is distant from the diffusion plate to correspond to the receiving openings;

wherein each of the backlight sources comprises a printed circuit board and a plurality of LED lights mounted to and electrically connected to the printed circuit board;

wherein the bottom board comprises a circumferential frame and braces mounted to the circumferential frame, the circumferential frame and the braces forming therebetween the receiving openings;

wherein the braces are arranged in a cross form and are mounted to the circumferential frame by bolts, the braces and the circumferential frame defining four receiving openings, the backlight sources being correspondingly of a number of four;

wherein the backlight sources are mounted to the backplane by bolts;

wherein the circumferential frame is rectangular in shape and comprises two opposite first connection plates and two second connection plates respectively connected to opposite ends of the two first connection plates; and wherein the side boards comprise two first side walls that are respectively and perpendicularly connected to the two first connection plates and two second side walls that are respectively perpendicularly connected to the two second connection plates.

The present invention also provides a liquid crystal display module, which comprises a backlight module, a mold frame arranged on the backlight module, a liquid crystal display panel arranged on the mold frame, and a front enclosure arranged on the liquid crystal display panel. The backlight module comprises a backplane, a diffusion platen arranged inside the backplane, and a plurality of backlight sources mounted to the backplane and located under the diffusion plate. The backplane comprises a bottom board and side boards connected to the bottom board. The bottom board forms a plurality of receiving openings. The backlight sources are mounted to a side of the bottom board that is distant from the diffusion plate to correspond to the receiving openings.

The bottom board comprises a circumferential frame and braces mounted to the circumferential frame. The circumferential frame and the braces form therebetween the receiving openings. The braces are arranged in a cross form and are mounted to the circumferential frame by bolts. The braces and the circumferential frame define four receiving openings. The backlight sources are correspondingly of a number of four.

The circumferential frame is rectangular in shape and comprises two opposite first connection plates and two second connection plates respectively connected to opposite ends of the two first connection plates. The side boards comprise two first side walls that are respectively and perpendicularly connected to the two first connection plates and two second side walls that are respectively perpendicularly connected to the two second connection plates.

The efficacy of the present invention is that the present invention provides a direct backlight module and a liquid crystal display module using the backlight module, in which a backplane having a bottom board that comprises a circumferential frame and braces collectively defining receiving openings and backlight sources are mounted to a side of the bottom board that is distant from a diffusion plate to correspond to the receiving openings, whereby to maintain or replace the backlight sources, it only needs to remove the backlight sources without removing other components, such as a front enclosure, a liquid crystal display panel, a mold frame, and the diffusion plate, so as to save labor and material, effectively lower down maintenance cost, and avoid the potential risk of damaging the front enclosure, the liquid crystal display panel, the mold frame, and the diffusion plate in removing these components and thus increasing the maintenance cost.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of one or more embodiments of the present invention, with reference to the attached drawings. In the drawings.

DETAILED DESCRIPTION OF THE PREFERRED EMBODIMENTS

Figure 1:
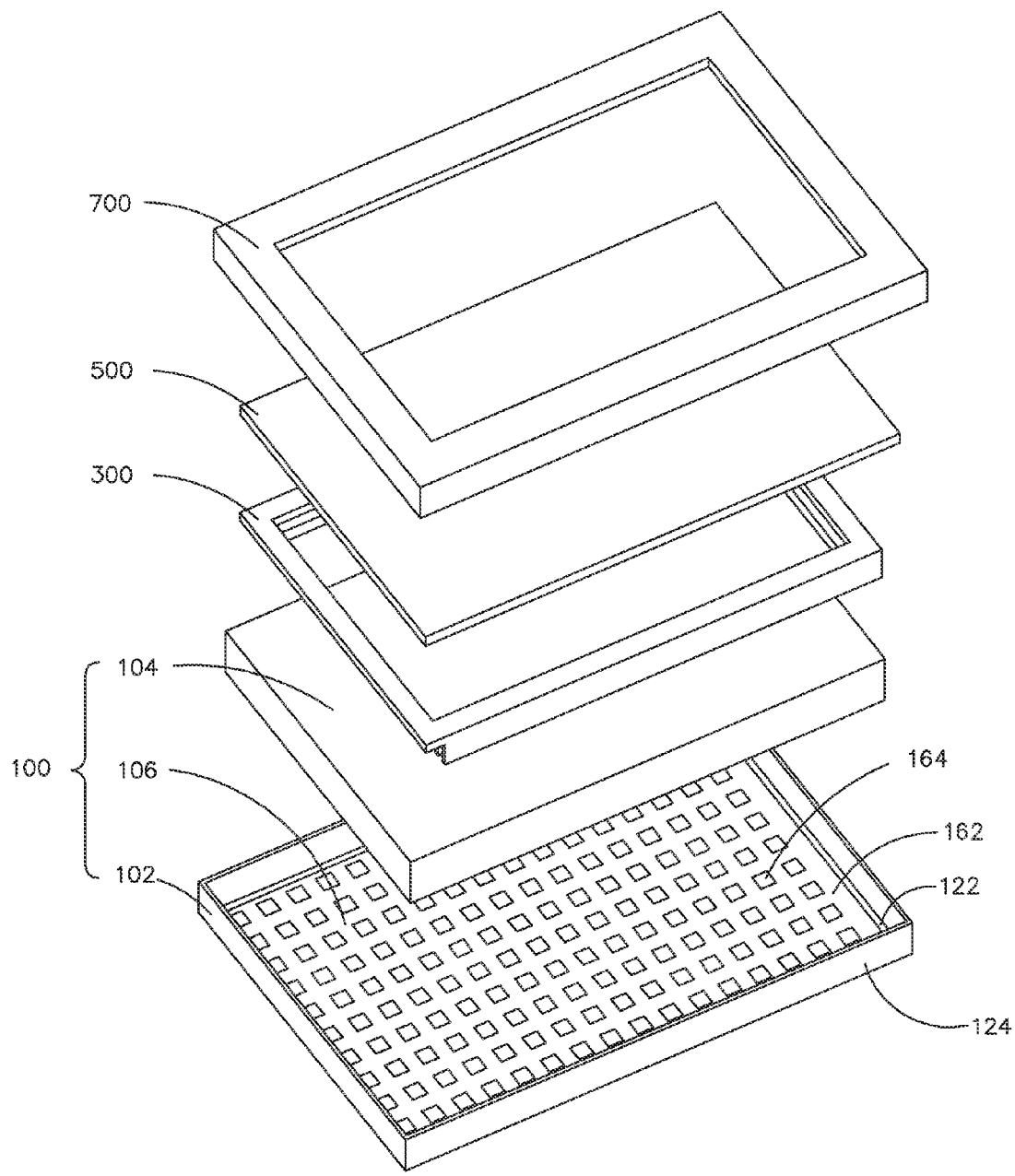
FIG. 1 is an exploded view showing a conventional liquid crystal display module.
Figure 2:
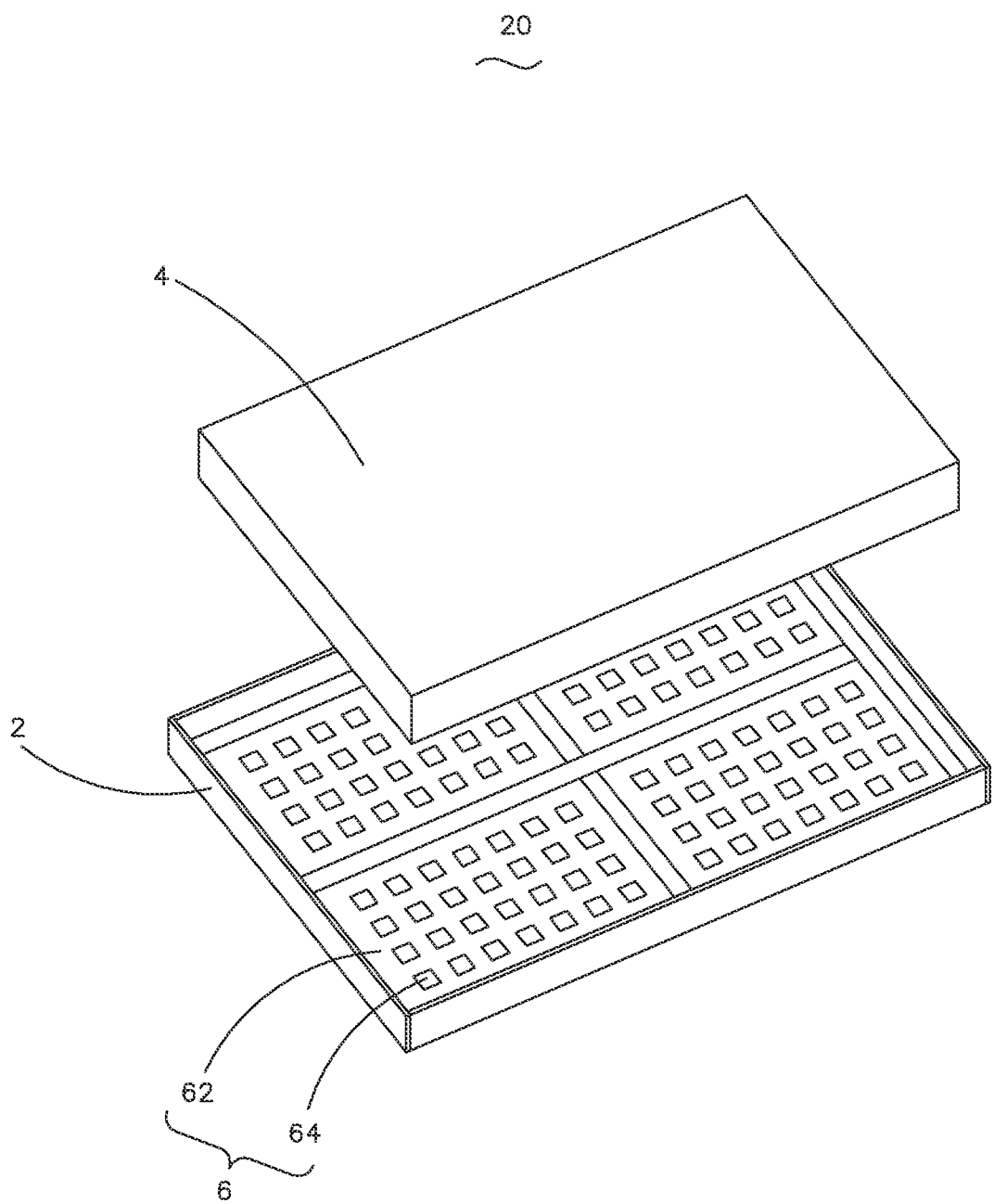
FIG. 2 is an exploded view showing a direct backlight module according to the present invention.
Figure 3:
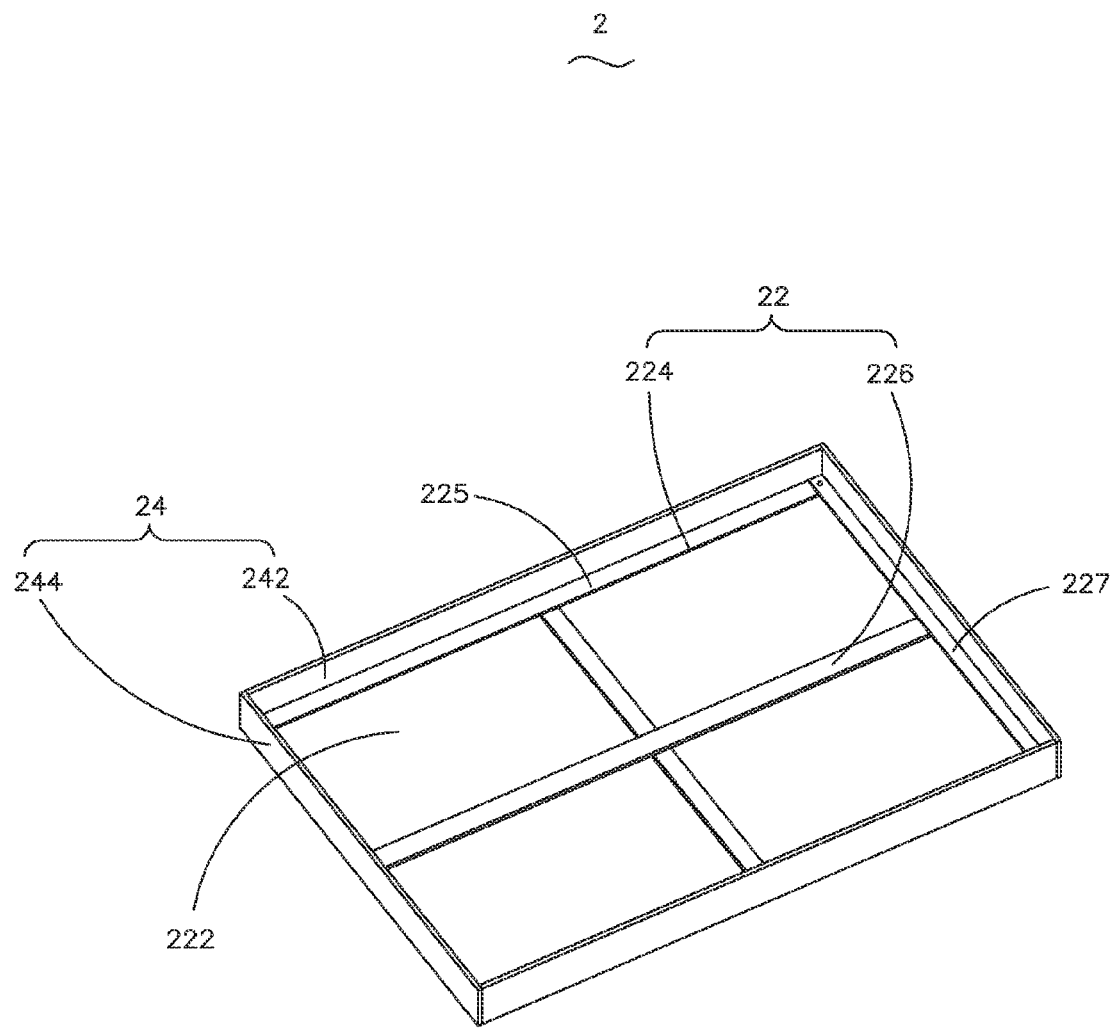
FIG. 3 is a perspective view showing a backplane of FIG. 2.
Figure 4:
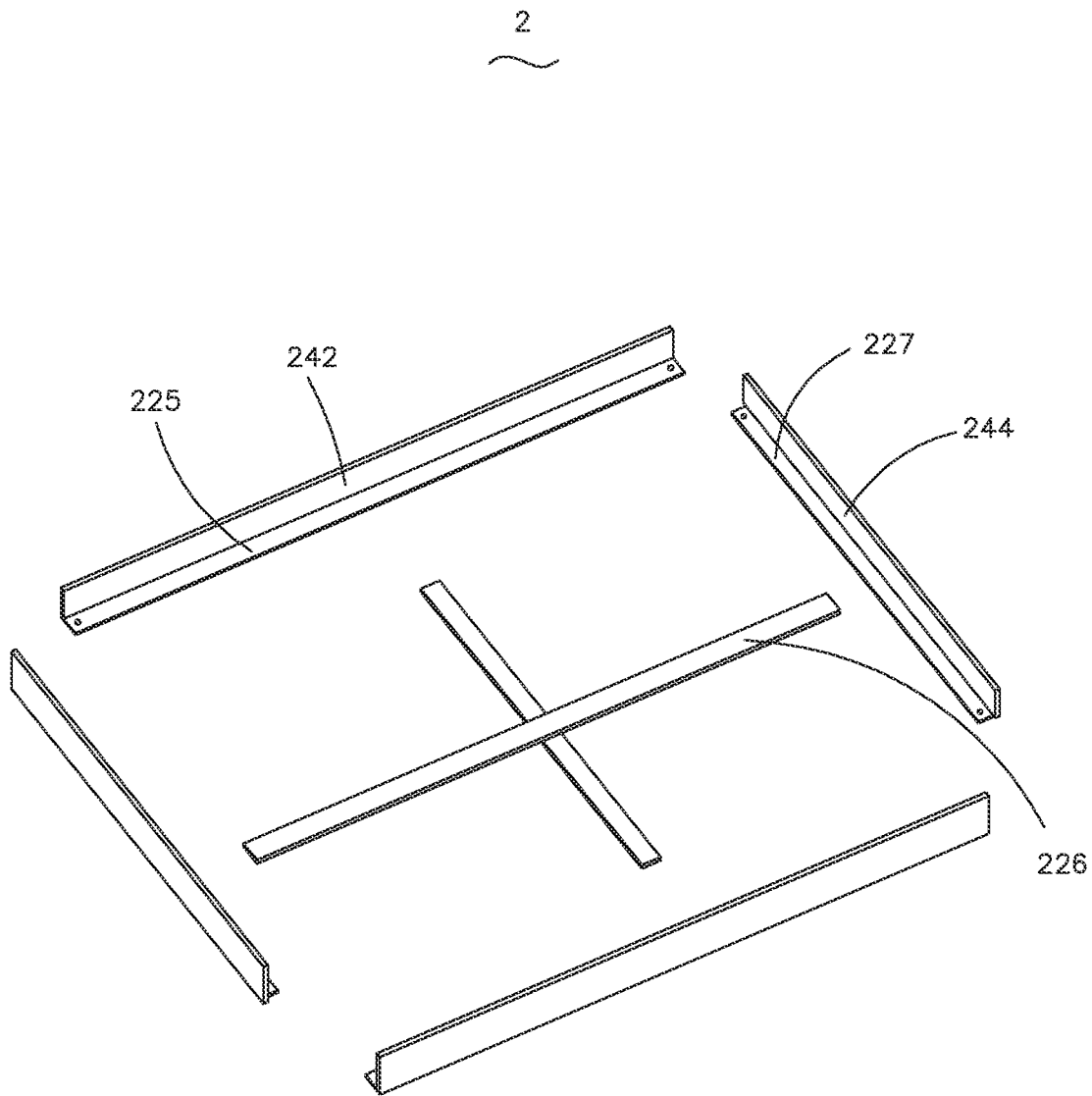
FIG. 4 is an exploded view showing the backplane according to the present invention.
Figure 5:
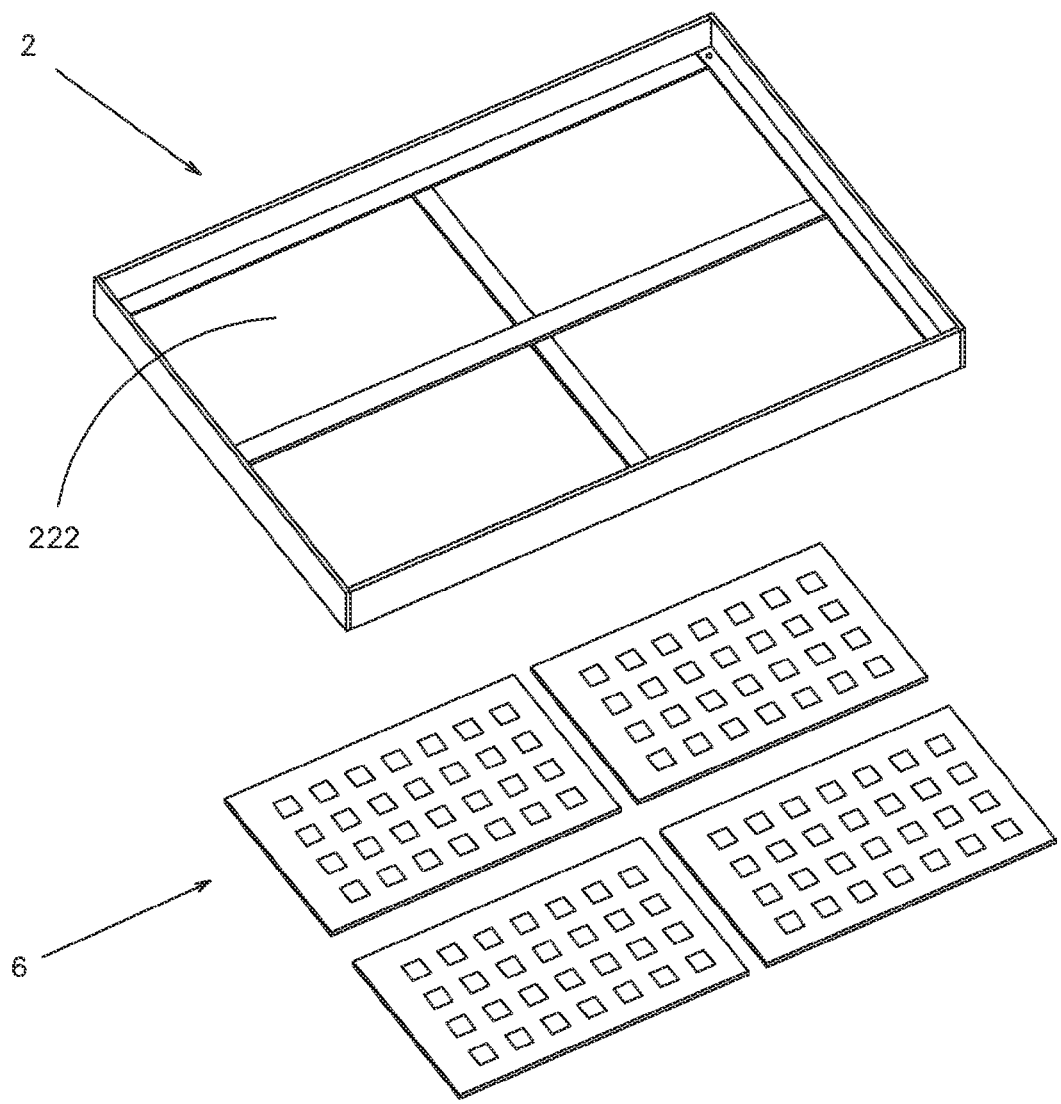
FIG. 5 is an exploded view showing the backplane and backlight sources according to the present invention.

To further expound the technical solution adopted in the present invention and the advantages thereof, a detailed description is given to a preferred embodiment of the present invention and the attached drawings.

Referring to FIGS. 2-5, the present invention provides a direct backlight module 20, which comprises a backplane 2, a diffusion plate 4 arranged inside the backplane 2, and a plurality of backlight sources 6 mounted on the backplane 2 and located under the diffusion plate 4.

The backplane 2 comprises a bottom board 22 and side boards 24 connected to the bottom board 22. The bottom board 22 forms a plurality of receiving openings 222. The backlight sources 6 is mounted to a side of the bottom board 22 that is distant from the diffusion plate 4 to correspond to the receiving openings 222. To maintain or replace the backlight sources 6, it is not necessary to remove the diffusion plate 4 and the backlight sources 6 can be removed from the underside of the backplane 2. The operation is simple so as to save a great amount of maintenance time and reduce maintenance cost.

The bottom board 22 comprises a circumferential frame 224 and braces 226 mounted on the circumferential frame 224. The circumferential frame 224 and the braces 226 form receiving openings 222 therebetween. In the instant embodiment, the braces 226 are arranged in a cross form and are mounted to the circumferential frame 224 by bolts. The braces 226 and the circumferential frame 224 define four receiving openings 222 and the backlight sources 6 are correspondingly of a number of four. The backlight sources 6 are mounted to an outer side of the bottom board 22 of the backplane 2 by bolts.

The circumferential frame 224 is rectangular in shape and comprises two opposite first connection plates 225 and two second connection plates 227 respectively connected to opposite ends of the two first connection plates 225. The two first connection plates 225 and the two second connection plates 227 are successively connected in an end-to-end manner to form the circumferential frame 224.

The side boards 24 comprise two first side walls 242 that are respectively and perpendicularly connected to the two first connection plates 225 and two second side walls 244 that are respectively perpendicularly connected to the two second connection plates 227.

Preferably, the first side walls 242 and the first connection plates 225 are respectively integrally formed and the second side walls 244 and the second connection plates 227 are respectively integrally formed.

Figure 6:
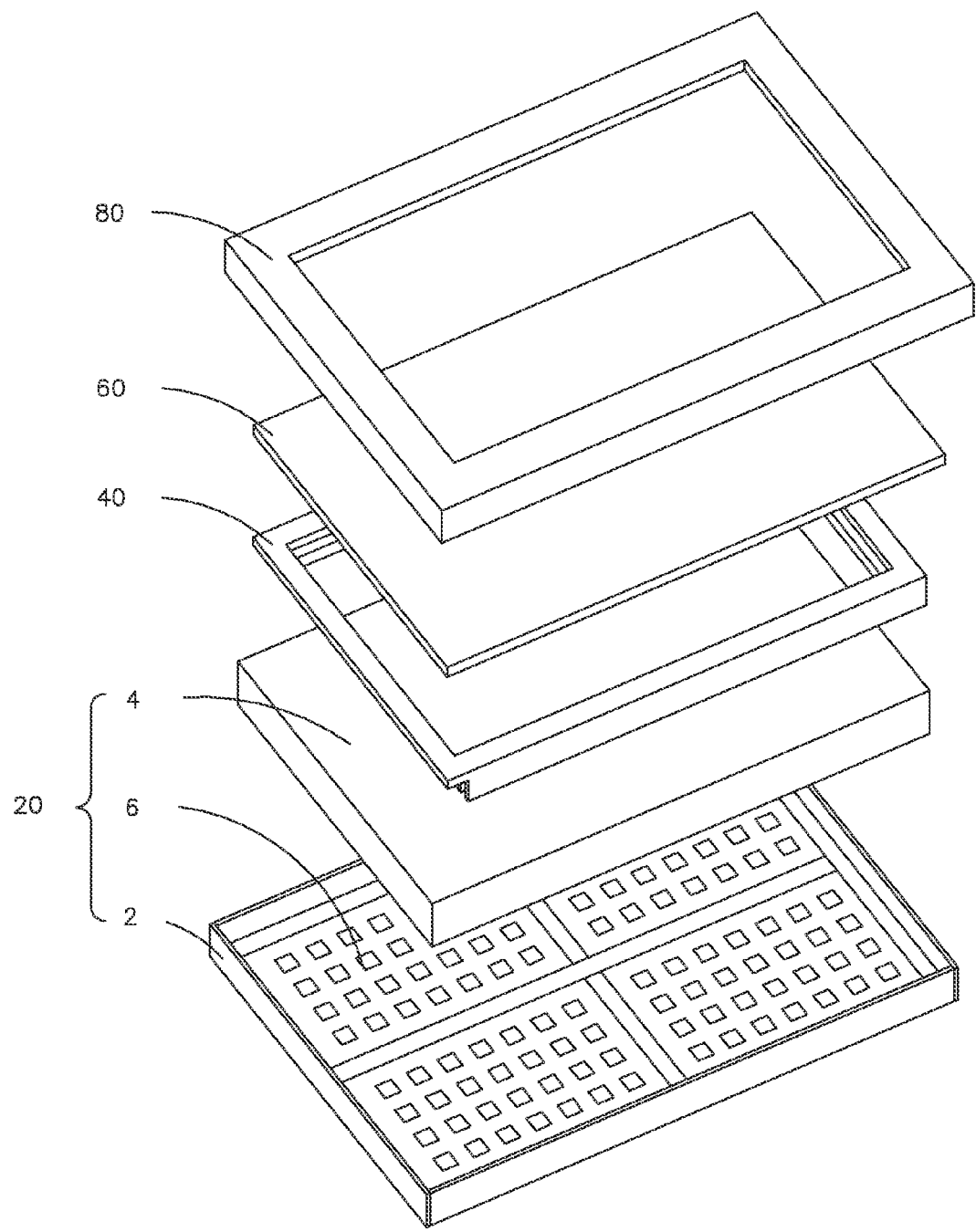
FIG. 6 is an exploded view showing a liquid crystal display module according to the present invention.

Referring to FIG. 6, in combination with FIGS. 2-5, the present invention also provides a liquid crystal display module, which comprises a backlight module 20, a mold frame 40 arranged on the backlight module 20, a liquid crystal display panel 60 arranged on the mold frame 40, and a front enclosure 80 arranged on the liquid crystal display panel 60.

The backlight module 20 comprises a backplane 2, a diffusion plate 4 arranged inside the backplane 2, and a plurality of backlight sources 6 mounted on the backplane 2 and located under the diffusion plate 4.

The backplane 2 comprises a bottom board 22 and side boards 24 connected to the bottom board 22. The bottom board 22 forms a plurality of receiving openings 222. The backlight sources 6 is mounted to a side of the bottom board 22 that is distant from the diffusion plate 4 to correspond to the receiving openings 222. To maintain or replace the backlight sources 6, it is not necessary to remove the diffusion plate 4 and the backlight sources 6 can be removed from the underside of the backplane 2. The operation is simple so as to save a great amount of maintenance time and reduce maintenance cost.

The bottom board 22 comprises a circumferential frame 224 and braces 226 mounted on the circumferential frame 224. The circumferential frame 224 and the braces 226 form receiving openings 222 therebetween. In the instant embodiment, the braces 226 are collectively arranged in a cross form and are mounted to the circumferential frame 224 by bolts. The braces 226 and the circumferential frame 224 define four receiving openings 222 and the backlight sources 6 are correspondingly of a number of four. The backlight sources 6 are mounted to an outer side of the bottom board 22 of the backplane 2 by bolts.

The circumferential frame 224 is rectangular in shape and comprises two opposite first connection plates 225 and two second connection plates 227 respectively connected to opposite ends of the two first connection plates 225. The two first connection plates 225 and the two second connection plates 227 are successively connected in an end-to-end manner to form the circumferential frame 224.

The side boards 24 comprise two first side walls 242 that are respectively and perpendicularly connected to the two first connection plates 225 and two second side walls 244 that are respectively perpendicularly connected to the two second connection plates 227.

Preferably, the first side walls 242 and the first connection plates 225 are respectively integrally formed and the second side walls 244 and the second connection plates 227 are respectively integrally formed.

In summary, the present invention provides a direct backlight module and a liquid crystal display module using the backlight module, in which a backplane having a bottom board that comprises a circumferential frame and braces collectively defining receiving openings and backlight sources are mounted to a side of the bottom board that is distant from a diffusion plate to correspond to the receiving openings, whereby to maintain or replace the backlight sources, it only needs to remove the backlight sources without removing other components, such as a front enclosure, a liquid crystal display panel, a mold frame, and the diffusion plate, so as to save labor and material, effectively lower down maintenance cost, and avoid the potential risk of damaging the front enclosure, the liquid crystal display panel, the mold frame, and the diffusion plate in removing these components and thus increasing the maintenance cost.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A direct backlight module, comprising a backplane, a diffusion plate arranged inside the backplane, and a plurality of backlight sources mounted to the backplane and located under the diffusion plate, each of the backlight sources comprising a circuit board and a plurality of light emitting diode (LED) lights mounted to and electrically connected to the circuit board, the backplane comprising a bottom board and side boards connected to the bottom board, the bottom board forming a plurality of receiving openings, the backlight sources being mounted to a side of the bottom board that is distant from the diffusion plate to correspond to the receiving openings in such a way that the backlight sources are respectively mounted to the receiving openings and each of the receiving openings receives the respective one of the backlight sources to mount thereto, wherein each of the receiving openings corresponds to and receives only one circuit comprising of the respective one of the backlight sources.

2. The direct backlight module as claimed in claim 1, wherein the bottom board comprises a circumferential frame and braces mounted to the circumferential frame, the circumferential frame and the braces forming therebetween the receiving openings.

3. The direct backlight module as claimed in claim 2, wherein the braces are arranged in a cross form and are mounted to the circumferential frame by bolts, the braces and the circumferential frame defining four receiving openings, the backlight sources being correspondingly of a number of four.

4. The direct backlight module as claimed in claim 1, wherein the backlight sources are mounted to the backplane by bolts.

5. The direct backlight module as claimed in claim 2, wherein the circumferential frame is rectangular in shape and comprises two opposite first connection plates and two second connection plates respectively connected to opposite ends of the two first connection plates.

6. The direct backlight module as claimed in claim 5, wherein the side boards comprise two first side walls that are respectively and perpendicularly connected to the two first connection plates and two second side walls that are respectively perpendicularly connected to the two second connection plates.

7. A direct backlight module, comprising a backplane, a diffusion plate arranged inside the backplane, and a plurality of backlight sources mounted to the backplane and located under the diffusion plate, the backplane comprising a bottom board and side boards connected to the bottom board, the bottom board forming a plurality of receiving openings, the backlight sources being mounted to a side of the bottom board that is distant from the diffusion plate to correspond to the receiving openings in such a way that the backlight sources are respectively mounted to the receiving openings and each of the receiving openings receives the respective one of the backlight sources to mount thereto, wherein each of the receiving openings corresponds to and receives only one circuit comprising of the respective one of the backlight sources;

wherein each of the backlight sources comprises a printed circuit board and a plurality of light emitting diode (LED) lights mounted to and electrically connected to the printed circuit board;

wherein the bottom board comprises a circumferential frame and braces mounted to the circumferential frame, the circumferential frame and the braces forming therebetween the receiving openings;

wherein the braces are arranged in a cross form and are mounted to the circumferential frame by bolts, the braces and the circumferential frame defining four receiving openings, the backlight sources being correspondingly of a number of four;

wherein the backlight sources are mounted to the backplane by bolts;

wherein the circumferential frame is rectangular in shape and comprises two opposite first connection plates and two second connection plates respectively connected to opposite ends of the two first connection plates; and wherein the side boards comprise two first side walls that are respectively and perpendicularly connected to the two first connection plates and two second side walls that are respectively perpendicularly connected to the two second connection plates.

8. A liquid crystal display module, comprising a backlight module, a mold frame arranged on the backlight module, a liquid crystal display panel arranged on the mold frame, and a front enclosure arranged on the liquid crystal display panel, the backlight module comprising a backplane, a diffusion plate arranged inside the backplane, and a plurality of backlight sources mounted to the backplane and located under the diffusion plate, each of the backlight sources comprising a circuit board and a plurality of light emitting diode (LED) lights mounted to and electrically connected to the circuit board, the backplane comprising a bottom board and side boards connected to the bottom board, the bottom board forming a plurality of receiving openings, the backlight sources being mounted to a side of the bottom board that is distant from the diffusion plate to correspond to the receiving openings in such a way that the backlight sources are respectively mounted to the receiving openings and each of the receiving openings receives the respective one of the backlight sources to mount thereto, wherein each of the receiving openings corresponds to and receives only one circuit comprising of the respective one of the backlight sources.

9. The liquid crystal display module as claimed in claim 8, wherein the bottom board comprises a circumferential frame and braces mounted to the circumferential frame, the circumferential frame and the braces forming therebetween the receiving openings, the braces being arranged in a cross form and mounted to the circumferential frame by bolts, the braces and the circumferential frame defining four receiving openings, the backlight sources being correspondingly of a number of four.

10. The liquid crystal display module as claimed in claim 9, wherein the circumferential frame is rectangular in shape and comprises two opposite first connection plates and two second connection plates respectively connected to opposite ends of the two first connection plates, the side boards comprising two first side walls that are respectively and perpendicularly connected to the two first connection plates and two second side walls that are respectively perpendicularly connected to the two second connection plates.

* * * * *